United States Patent

Kosugi et al.

Patent Number: 6,166,682
Date of Patent: Dec. 26, 2000

[54] RADAR DEVICE AND OBJECT DETECTION METHOD

[75] Inventors: Masanori Kosugi, Saltama, Japan; Shigeaki Hakusui, Boxford, Mass.

[73] Assignee: Omron Corporation, Kyoto, Japan

[21] Appl. No.: 09/340,678

[22] Filed: Jun. 29, 1999

[30] Foreign Application Priority Data

Jun. 29, 1998 [JP] Japan ................................. 10-181862

[51] Int. Cl.$^7$ ............................. G01S 13/04; G01S 13/08
[52] U.S. Cl. ........................ 342/192; 342/27; 342/118; 342/128; 342/195; 342/196
[58] Field of Search ................................. 342/27, 28, 104, 342/109, 118–124, 127–129, 192–197, 62, 188

[56] References Cited

U.S. PATENT DOCUMENTS

| | | | |
|---|---|---|---|
| 3,972,042 | 7/1976 | Johnson | 342/62 |
| 4,166,973 | 9/1979 | Lilly, Jr. et al. | 342/27 X |
| 4,256,275 | 3/1981 | Flick et al. | 342/62 X |
| 4,443,792 | 4/1984 | Pidgeon et al. | 342/124 |
| 5,334,981 | 8/1994 | Smith et al. | 342/27 |

*Primary Examiner*—Bernarr E. Gregory
*Attorney, Agent, or Firm*—Dickstein Shapiro Morin & Oshinsky LLP

[57] ABSTRACT

A radar device capable of discriminating a person possessing metals from a person having no metals by transmitting a radio wave includes a voltage controlled oscillator for generating a radio wave, an antenna for transmitting the radio wave generated by the voltage controlled oscillator and for receiving a reflected wave from metals as an object irradiated by the radio wave transmitted by the antenna, a multiplier for detecting a beat component of the wave transmitted by the antenna and the reflected wave received by the antenna, and an FFT operator for analyzing a frequency spectrum of the beat component detected by the multiplier, a recording unit for previously storing a predetermined reference pattern, and a comparison unit for comparing the analyzed result by the FFT operator with the reference pattern stored in the recording unit.

8 Claims, 8 Drawing Sheets

RADAR DEVICE AND OBJECT DETECTION METHOD

BACKGROUND OF THE INVENTION

1. Field of the Invention

This invention relates to a radar device and an object detection method, and more particularly to an improved radar device and object detection method, which are able to detect the metals possessed by a person.

2. Description of the Related Art

It becomes necessary in security protection to watch whether or not a person hides a camera at the entrance of a facility, such as an institute, for example, which needs to be maintained secret. A conventional metal detecting method used in the field of such security protection employs X-radiation, a high frequency oscillation, magnetism, or the like.

A well-known metal detection device employing such a conventional metal detecting method, however, has the disadvantage that it cannot detect metals without fully approaching the same. A millimeter wave radar device has been proposed as a device, which can detect metals without closely approaching the same. A proposed millimeter wave radar device is mounted into an automobile to detect another automobile dozens of meters away from the radar device. It is theoretically assumed that other body reflecting electric wave (background) does not exist in neighborhood of the another automobile to be detected. Accordingly, it is difficult to distinguish a person possessing metals from a person possessing no metals at gateway because a reflected wave from the person is also simultaneously detected when the person hides the metals.

SUMMARY OF THE INVENTION

It is, therefore, a primary object of this invention to provide a device and a method capable of distinguishing a person possessing metals from a person possessing no metals for detecting the metals.

According to this invention, there is provided a radar device including a transmitting means for transmitting a radio wave, a receiving means for receiving a reflected wave from an object irradiated by the radio wave transmitted by the transmitting means, a beat detecting means for detecting a beat component of the wave transmitted by the transmitting means and the reflected wave received by the receiving means, an analyzing means for analyzing a frequency spectrum of the beat component detected by the beat detecting means, a storage means for previously storing a predetermined reference pattern, and a comparing means for comparing the analyzed results by the analyzing means with the reference pattern stored in the storage means.

According to this invention, there is provided an object detecting method including the steps of transmitting a radio wave, receiving a reflected wave from an object irradiated by the radio wave transmitted in the transmitting step, detecting a beat component of the wave transmitted in the transmitting step and the reflected wave received in the receiving step, analyzing a frequency spectrum of the beat component detected in the beat detecting step, previously storing a predetermined reference pattern, and comparing the analyzed result in the analyzing step with the reference pattern stored in the storing step.

In the radar device and the object detecting method according to this invention, the transmitted radio wave and the frequency spectrum of beat component of reflected wave of radio wave are analyzed, and the analyzed result is compared with the previously stored reference pattern, whereby the person possessing metals may be distinguished from the person possessing no metals.

BRIEF DESCRIPTION OF THE DRAWINGS

For a more complete understanding of this invention reference is now made to the following description of the accompanying drawings wherein.

DESCRIPTION OF THE PREFERRED EMBODIMENT

Figure 1:
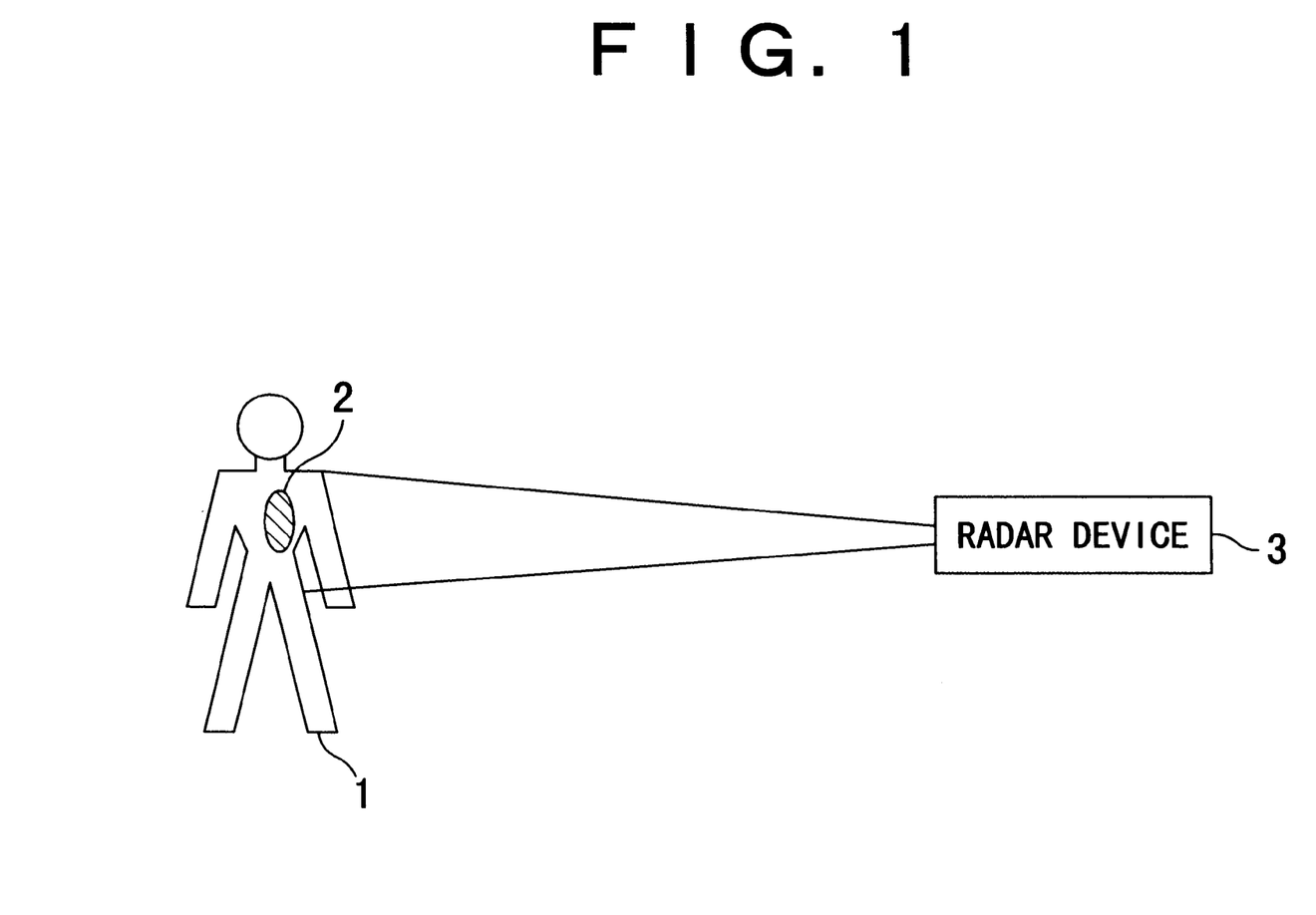
FIG. 1 shows a radar device in use as a preferred embodiment according to this invention.

Referring to, now, to FIG. 1, there is schematically shown a radar device 3 as a preferred embodiment of this invention. The radar device 3 of this embodiment is of a carrying model, irradiates a radio wave to a person 1 walking in entrances of various facilities, and receives the reflected wave to detect whether or not the person 1 possesses or hides metals 2 (for example, camera).

Figure 2:
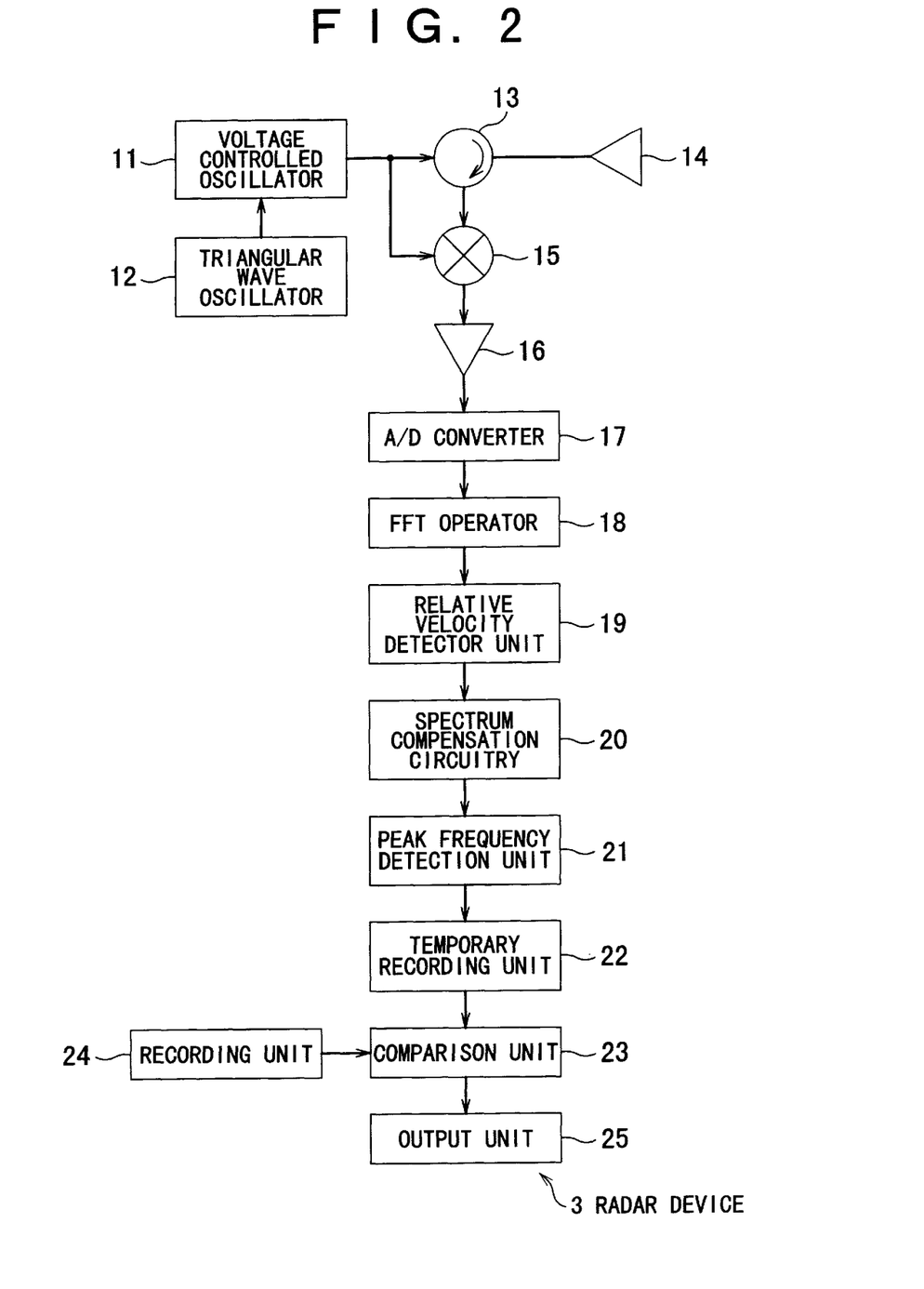
FIG. 2 is a schematic block diagram showing a construction of the radar device of FIG. 1.

FIG. 2 shows an internal construction of the radar device 3 of this embodiment, which includes a voltage controlled oscillator 11 (generating means) for generating a radio wave, an antenna 14 (transmitting means) for transmitting the radio wave generated by the oscillator 11 and (receiving means) for receiving a reflected wave from metals 2 as an object irradiated by the radio wave transmitted by the antenna 14 (transmitting means), a multiplier 15 (beat detecting means) for detecting a beat component of the wave transmitted by the antenna 14 (transmitting means) and the reflected wave received by the antenna 14 (receiving means), and an FFT operator 18 (analyzing means) for analyzing a frequency spectrum of the beat component detected by the multiplier 15 (beat detecting means), a recording unit 24 (storage means) for previously storing a predetermined reference pattern, and a comparison unit 23 (comparing means) for comparing the analyzed result by the FFT operator 18 (analyzing means) with the reference pattern stored in the recording unit 24 (storage means).

The device 3 further includes a relative velocity detector unit 19 (operating means) for computing a relative velocity of the object to be detected, and a spectrum compensation circuitry 20 (compensating means) for compensating the frequency spectrum analyzed by the FFT operator 18 (analyzing means).

The device 3 also includes a peak frequency detection unit 21 (peak frequency detecting means) for detecting a peak frequency of the frequency spectrum analyzed by the FFT operator 18 (analyzing means), and the comparison unit 23 compares the pattern of level variations of the peak frequency spectrum detected by the peak frequency detection unit 21 (peak frequency detecting means).

The voltage controlled oscillator 11 generates a signal of a frequency corresponding to a triangular wave produced by a triangular wave oscillator 12 to be applied to a circulator 13 and the multiplier 15. The circulator 13 is designed to apply an input to a neighbor terminal in a clockwise direction in FIG. 2. That is, the signal inputted by the voltage controlled oscillator 11 is applied to the antenna 14 connected to a terminal on the clockwise side. Thus, a signal (millimeter wave) having a 60 GHz frequency band generated by the voltage controlled oscillator 11 is irradiated toward the person 1 from the antenna 14.

The radio wave reflected from the person 1 having metals 2 or no metals is received by the antenna 14 to be applied to the multiplier 15 connected to a terminal neighbor in the clockwise direction. The circulator 13 is disposed to use the antenna 14 for transmission and reception. If the antenna 14 is designed to be separately disposed for transmission and reception, the circulator 13 is not necessary.

The multiplier 15 multiplies the signal generated by the voltage controlled oscillator 11 and the signal received by the antenna 14 to generate a beat component.

The output of the multiplier 15 is amplified by an amplifier 16 to be applied to an A/D (analog-to-digital) converter 17 for A/D conversion.

The FFT (Fast Fourier Transform) operator 18 converts the digital data inputted by the A/D converter 17 into a fast Fourier transform to frequency-analyze the beat component. The FFT operator 18 detects a frequency spectrum of the beat component.

The relative velocity detector device 19 detects a relative velocity between the radar device 3 and the person 1 as its object from the output of the FFT operator 18. The spectrum compensation circuitry 20 compensates the beat component when the voltage controlled oscillator 11 increases or decreases a frequency based on the triangular wave developed by the triangular wave oscillator 12.

The peak frequency detection device 12 detects a frequency component having the biggest level (a peak) in the inputted spectrum after compensation to apply the peak value to the temporary recording unit 22. The temporary recording unit 22 is designed to record the peak value applied by the peak frequency detection device 21 in a memory enclosed by the device 22.

A pattern of changes produced from the peak frequency detection device 21 is detected and recorded beforehand by receiving reflected waves when a radio wave is irradiated to the person 1 possessing metals 2 and the person 1 possessing no metals. The comparison device 23 is designed to compare the pattern recorded in the temporary recording unit 22 with the reference pattern recorded in the recording unit 24. The comparison device 23 may employ a neural network, a fuzzy inference device or the like. The comparison result from the comparison unit 23 is applied to an output unit 25 having a LCD, a speaker, a display device or the like.

Figure 3:
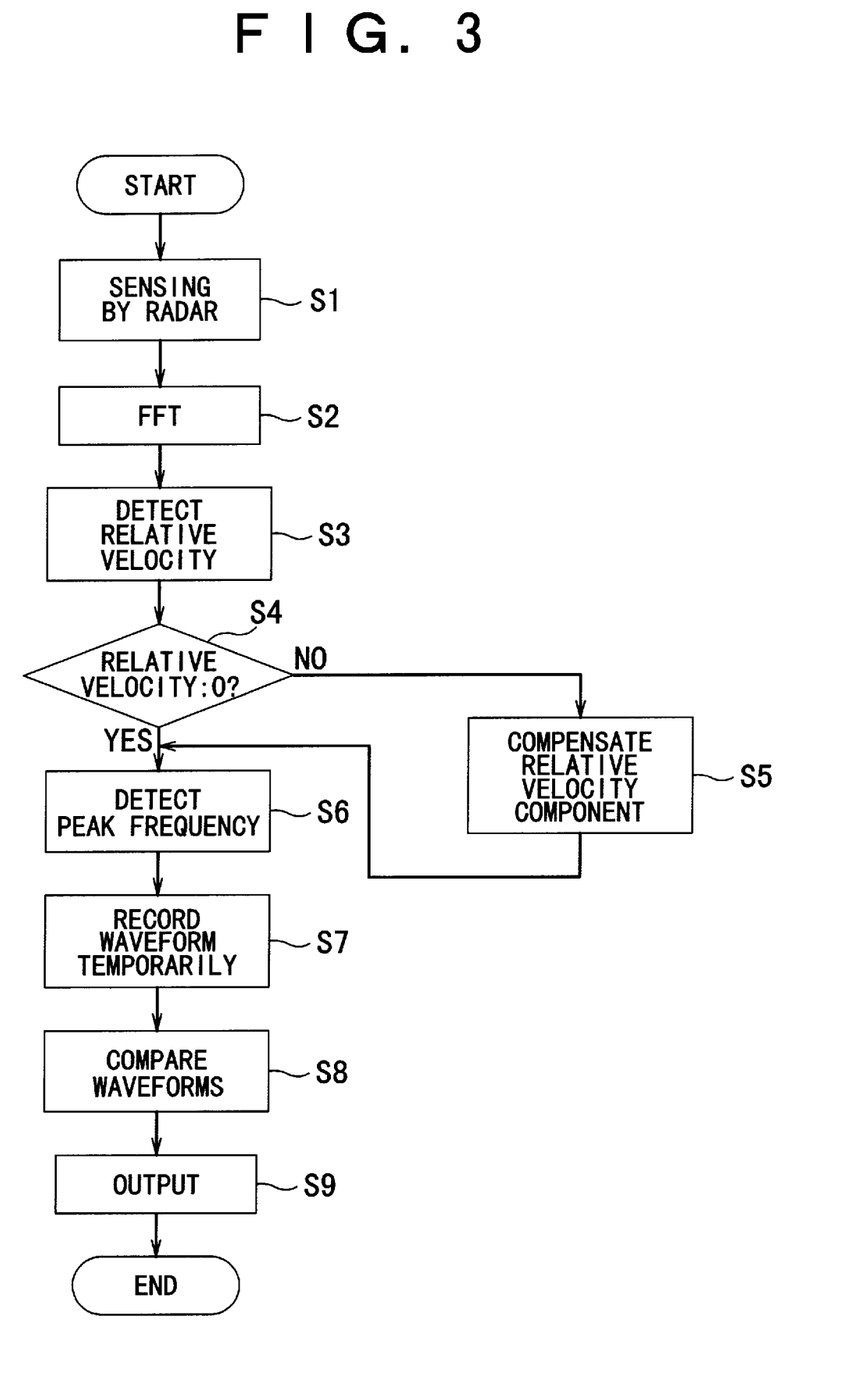
FIG. 3 is a flow chart showing an operation of the radar device of FIG. 2.

FIG. 3 shows a flow chart to explain the operation of the radar device 3. First, in a step S1, the radar device 3 of the portable type irradiates a radio wave toward a person 1, and the reflected wave from the person 1 is received for radar sensing. The voltage controlled oscillator 11 generates a higher frequency signal when the level of a signal (triangular wave) produced from the triangular wave oscillator 12 becomes large, and a lower frequency signal when the level becomes small. In other words, the voltage controlled oscillator 11 generates a frequency modulated signal by an output of the triangular wave oscillator 12.

The modulated wave produced from the voltage controlled oscillator 11 is irradiated from the antenna 14 through the circulator 13 as a radio wave.

The radio wave is reflected by the person 1, and the reflected wave is received by the antenna 14. The signal received by the antenna 14 is entered into the multiplier 15 through the circulator 13. The multiplier 15 is entered by the modulated wave produced from the voltage controlled oscillator 11, and multiplies the signal of the irradiated wave entered by the oscillator 11 and the signal of the reflected wave entered by the antenna 4 through the circulator 13 to produce a beat component (component of differential). The component of difference is amplified by the amplifier 16.

The voltage controlled oscillator 11, the triangular wave oscillator 12, the circulator 13, the antenna 14, the multiplier 15, and the amplifier 16 are operated according to the principle of FMCW (Frequency Modulated Continuous Wave).

Figure 4:
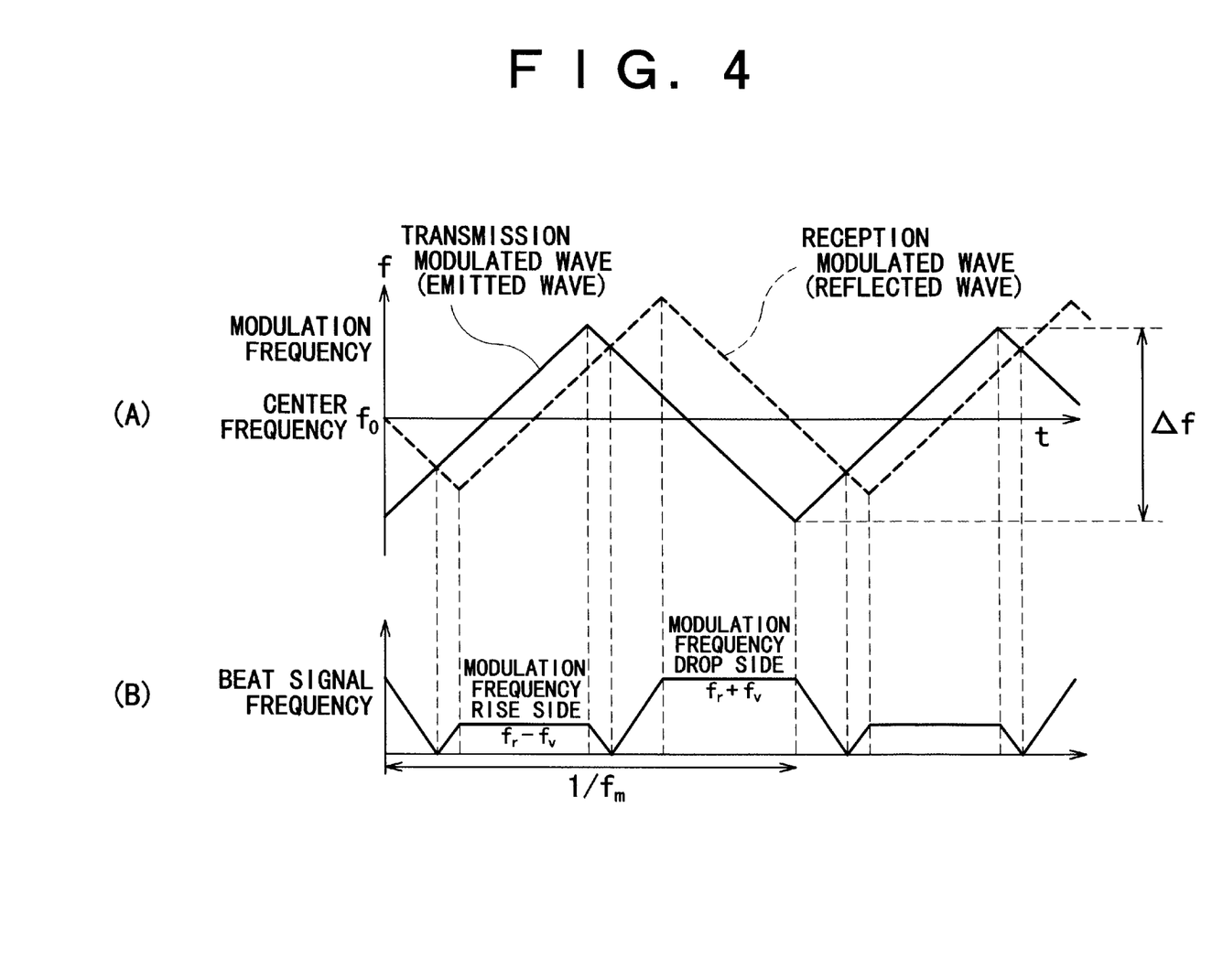
FIG. 4 shows waveforms showing an operation of the radar device of FIG. 2.

As shown in FIG. 4 at (A), the transmission modulated wave (emitted wave) produced from the voltage controlled oscillator 11 (antenna 14) periodically increases or decreases in correspondence with the triangular wave produced by the triangular wave oscillator 12. The reception modulated wave (reflected wave) received by the antenna 14 is shifted from the transmission modulated wave in phase. The shift of time base direction (a horizontal direction in FIG. 4) corresponds to the distance between the radar device 3 and the person 1 (the time from the transmission of the radio wave to the return of the wave). A change of frequency component of axis of ordinate direction in FIG. 4 corresponds to a relative velocity between the radar device 3 and the person 1 by so-called Doppler effect.

Assuming that the frequency of the beat component is represented by "$f_b$", the frequency $f_b$ is expressed by the following equation:

$$f_b = (4\Delta f \times f_m / C) R \pm (2f_o/C) V \tag{1}$$

"$\Delta f$" represents a frequency modulated width of the modulated wave produced by the voltage controlled oscillator 11, "$f_m$" represents a frequency of the triangular wave produced by the triangular wave oscillator 12, "C" represents the velocity of light, "$f_o$" represents a center frequency of carrier produced from the voltage controlled oscillator 11, "R" represents a distance from the radar device 3 to the person 1, "V" represents a relative velocity (m/sec) between the radar device 3 and the person.

As shown in FIG. 4 at (A), assuming that "$f_{up}$" represents a beat component when the frequency of the transmission modulated wave rises and "$f_{dn}$" represents the beat component when the frequency of the transmission modulated wave drops, the next expression is provided;

$$f_v = (f_{dn} + f_{up})/2$$

$$f_v = (f_{dn} - f_{up})/2 \tag{2}$$

wherein "$f_v$" represents a component (distance frequency) of a frequency of the beat signal for the correspondence to a distance from the radar device 3 to the person 1, and "$f_v$" represents a frequency (velocity frequency) corresponding to the relative velocity therebetween. When the equation (2) is produced, the following equation is provided;

$$f_{dn} = f_v + f_v$$

$$f_{up} = f_v - f_v \quad (3)$$

This relation is shown in FIG. 4 at (B).

By arranging the equations (1) and (2), the following equations are produced;

$$V = (C/2f_o)f_v$$

$$R = (C/4\Delta f \times f_m)f_v \quad (4)$$

Thus, in the radar device of the FM/CW type, the beat components of the emitted wave and the reflected wave may provide the distance R to an object to be detected and the relative velocity against the object.

Returning to FIG. 3, as the beat component is obtained, the sequence move to a step S2 where a Fast Fourier Transform is executed in the FFT operator 18. The beat component produced from the amplifier 16 is A/D converted by the A/D converter 17 to be applied to the FFT operator 18. The FFT operator 18 converts the entered beat component by Fast Fourier Transform to obtain the frequency spectrum of the beat component.

Next, the sequence moves to a step S3, wherein the relative velocity device 19 computes the relative velocity between the radar device 3 and the person 1 based on the output from the FFT operator 18. This relative velocity is obtained from the above-mentioned expression (4).

The sequence moves to a step S4, wherein the spectrum compensation circuitry 20 inquires whether or not the relative velocity computed in the step S3 is zero "0". Unless it is zero, the sequence moves to a step S5 wherein the relative velocity is compensated.

Figure 5:
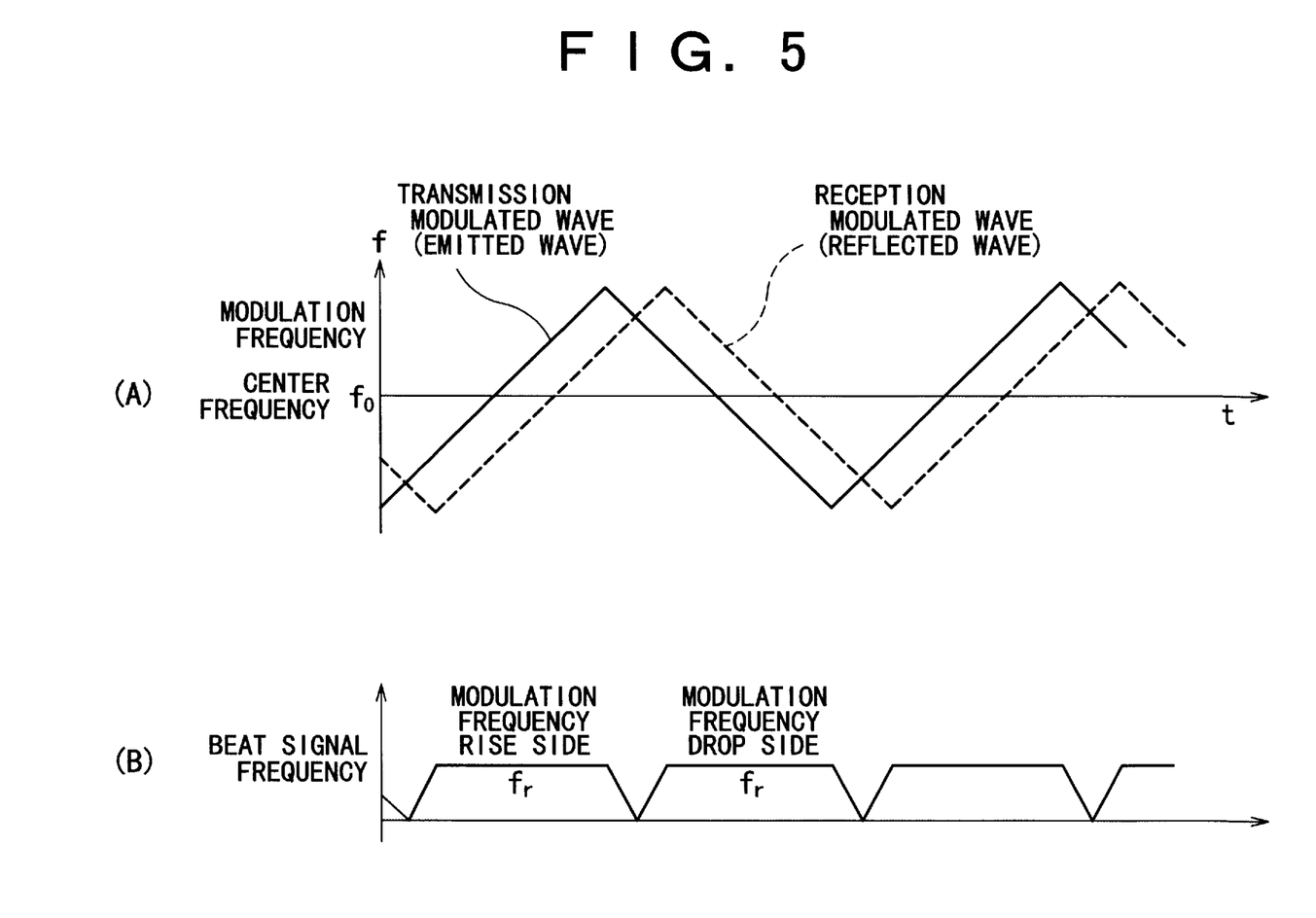
FIG. 5 shows waveforms showing an operation of the radar device of FIG. 2.

If the relative velocity between the radar device 3 and the person 1 is zero, the velocity frequency $f_v$ becomes zero and the beat signal frequencies when the transmission modulated wave and the reception modulated wave rise and drop become constant at $f_v$ as shown in FIG. 5. Accordingly, the frequency spectrum of the beat component produced by the FFT operator 18 becomes a predetermined frequency $f_b$ as shown in FIG. 6.

As shown in FIG. 4, unless the relative velocity is zero, the beat signal frequency $f_b$ becomes $f_{up}$ (=$f_v-f_v$) when the modulation frequency rises and $f_{dn}$ (=$f_v+f_v$) when the modulation frequency drops.

Figure 6:
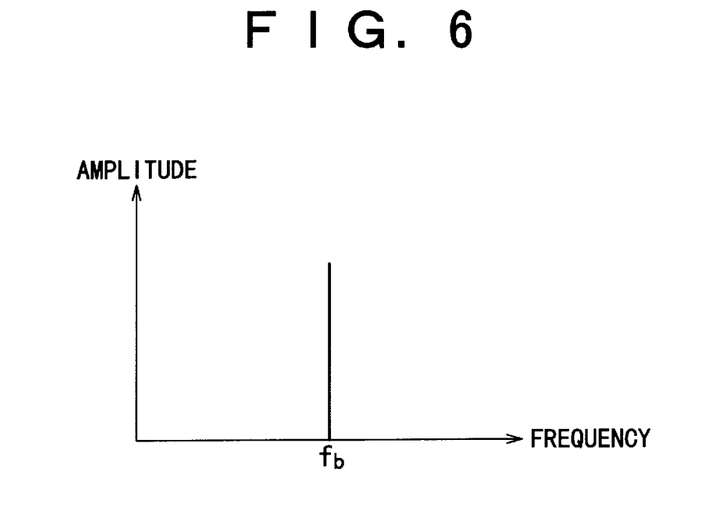
FIG. 6 shows an output of an FFT operator shown in FIG. 2.
Figure 7:
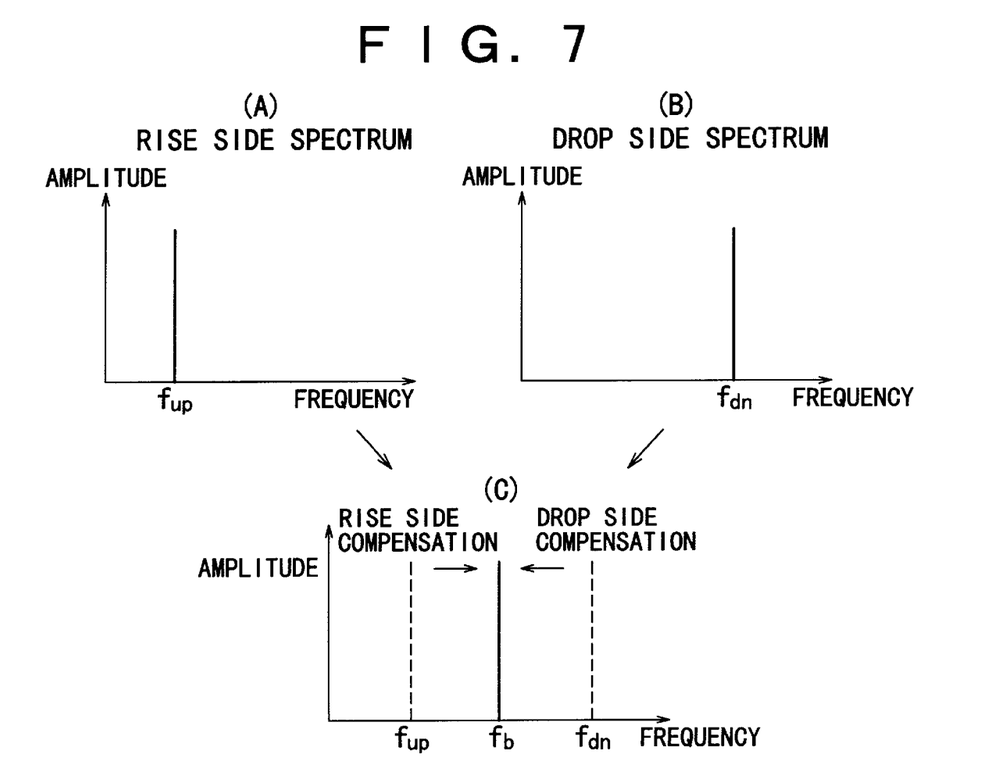
FIG. 7 shows an operation of a spectrum compensation circuitry shown in FIG. 2.

As shown in FIG. 7 at (A) and (B), when the relative velocity is not zero, two spectrums of the rise side spectrum of a frequency $f_{up}$ and the drop side spectrum of a frequency $f_{dn}$ are provided. The spectrum compensation circuitry 20 shifts the rise side spectrum of the frequency $f_{up}$ and the drop side spectrum of the frequency $f_{dn}$ by a degree corresponding to the relative velocity V as to frequencies for compensation. The frequency spectrum of the beat components becomes one as shown in FIG. 7 at (C) like FIG. 6 (in case that the relative velocity is zero). As a result, common processes are executed with the common devices regardless of the presence or absence of relative velocity afterward.

Because only one frequency spectrum which has been shown in FIG. 6 from the beginning is provided when the relative velocity is zero, any compensation process on the basis of relative velocity components becomes unnecessary. In this case, the process of the step S5 is skipped, and the sequence goes to a step S6 after the step S4.

Figure 8:
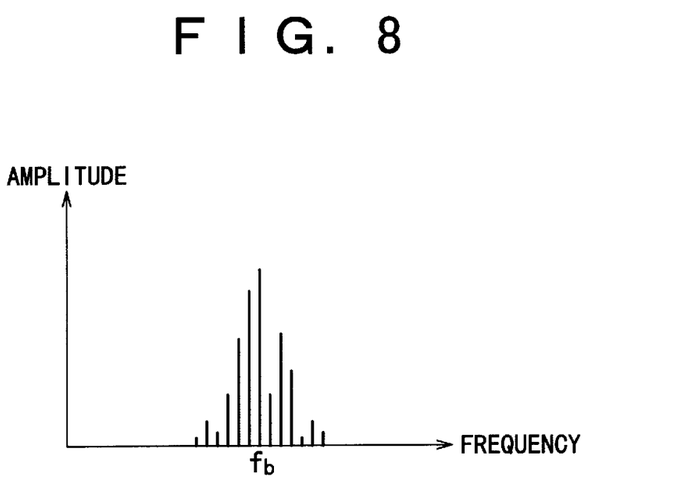
FIG. 8 shows an output of the FFT operator shown in FIG. 2.
Figure 9:
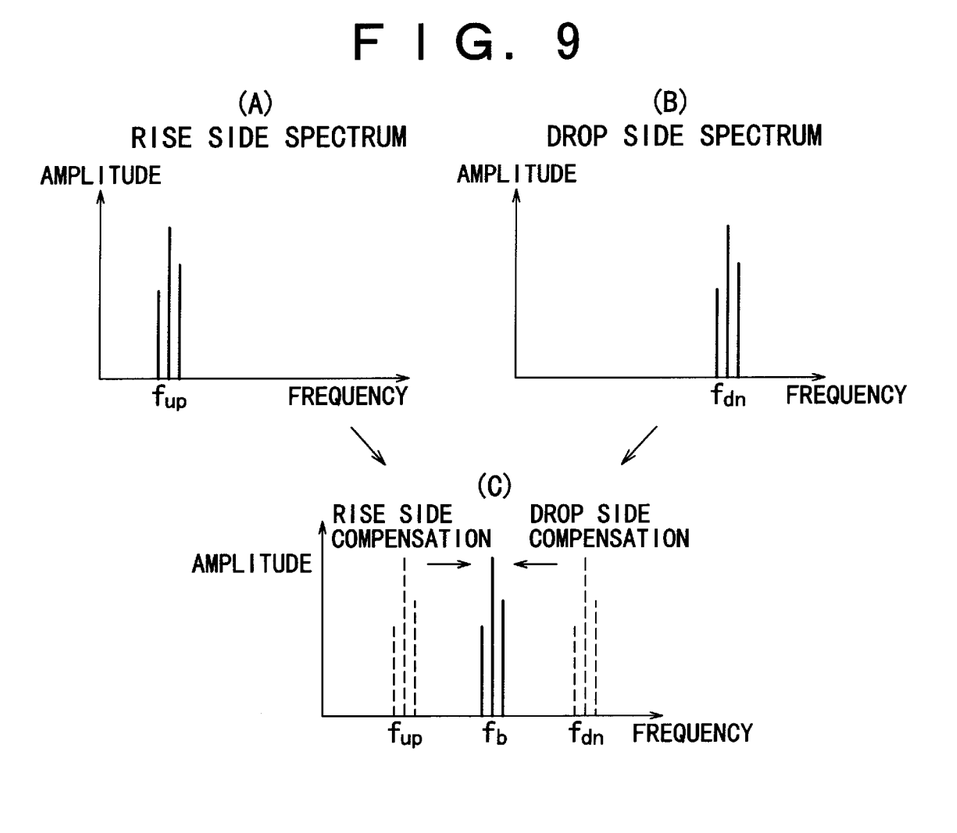
FIG. 9 shows an operation of the spectrum compensation circuitry shown in FIG. 2.

In the step S6, a peak frequency detection process is executed by the peak frequency detection unit 21. It is ideal that the frequency spectrum which the FFT operator 18 detects becomes the single spectrum as shown in FIG. 6. However, the fact is that a plurality of spectrums centered on the frequency $f_b$ are produced by noise, characteristics of the circuitry and so forth, as shown in FIG. 8. As a result, the compensation process in the spectrum compensation circuitry 20 is executed as to a plurality of spectrums centered on the frequency $f_b$ as shown in FIG. 9.

The peak frequency detection unit 21 detects a spectrum having the largest amplitude among thus produced plural spectrums as the spectrum of an original beat component. The peak value (amplitude value) of the detected beat component is applied to the temporary recording unit 22 from the peak frequency detection unit 21 to be recorded therein.

As described above, the radar device 3 is disposed to detect if a walking person 1 covers and carries the metals 2 though the person 1 always moves. Even if the person 1 stops and talks with other persons, a position of the body of he person 1 changes a little and the metals 2 also change a little as to its position. For instance, when a light beam is irradiated to a mirror at a remote location and the reflected light beam is received, the received light quantity greatly changes even by a positional slight change of the mirror. Accordingly, a slight positional change of the person 1 does not greatly affect the reflected wave, but a receivable reflection quantity (reflection direction) of a millimeter wave is greatly changed for the correspondence to a little displacement of the metals 2 by the slight positional change of the person.

Figure 10:
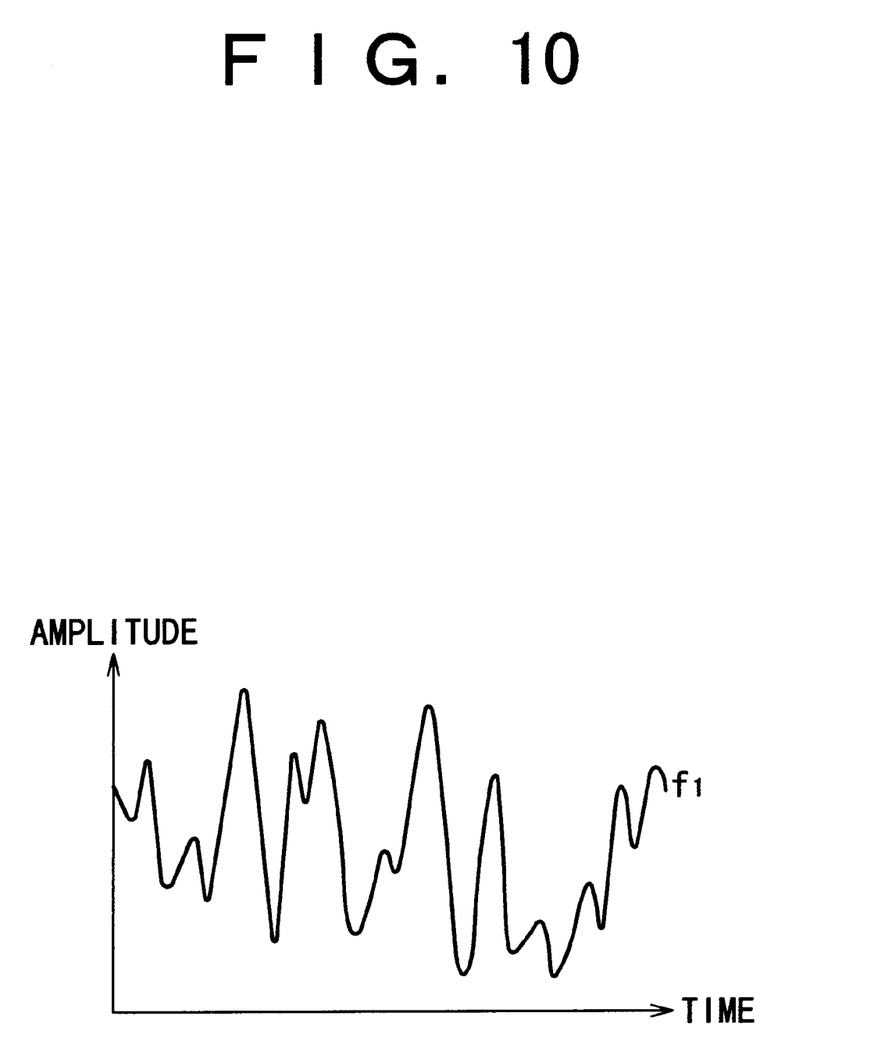
FIG. 10 is a waveform showing a recorded pattern stored in a temporary recording unit shown in FIG. 2.

So when the person 1 possesses the metals 2 and sampling is executed for a predetermined time period, a pattern having a big change of level is observed. When the person 1 does not possess the metals 2, only a reflected wave for the correspondence to a slight displacement of the person 1 is observed and the variation of the reflected wave is small. In the recording unit 24, a reference pattern when the person 1 possesses metals 2 and a reference pattern when does not possess it are recorded beforehand.

According to the above-mentioned principle, the comparison device 23 compares the reference pattern recorded in the recording unit 24 beforehand with the pattern currently recorded in the temporary recording unit 22, whereby it is inquired whether the observed pattern is close to the reference pattern of the person 1 possessing the metals 2 or the reference pattern of the person 1 possessing no metals (a step S8)

The comparison inquiry result is applied to the output device 25 to be displayed for an operator of this radar device 3. The display may represent the probability with a percentage or digital display that the metals 2 are possessed. In case of the former, the comparison result is displayed by changing the luminosity of a LCD (liquid crystal display) or the volume level of sound on an analog basis. In case of the later, the LCD is lighted on or a buzzer sounds when possession of the metals 2 by the person 1 is concluded, and the LCD is lighted off and the buzzer does not sound when the person 1 does not possess any metals.

This embodiment employs the principle of FMCW and millimeter waves, but this invention may be applied to a case when a radio wave having a wavelength is produced based on other principle. Having described an embodiment of this invention, it will now be apparent to those skilled in the art that many changes may be made without departing from the invention concepts. It is felt, therefore, that the invention should not be restricted to its disclosed embodiment, but rather should be limited only by the spirit and scope of the appended claims.

What is claimed is:

1. A radar device comprising:
   transmitting means for transmitting a radio wave, receiving means for receiving a reflected wave from an object irradiated by said radio wave transmitted by said transmitting means;

beat detecting means for detecting a beat component of said wave transmitted by said transmitting means and said reflected wave received by said receiving means;

a level detector for detecting a change in level in a pattern of said reflected wave received, said change in level determining if said object contains a metal;

analyzing means for analyzing a frequency spectrum of said beat component detected by said beat detecting means and analyzing said change in level detected by said level detector;

storage means for previously storing a predetermined reference pattern; and comparing means for comparing a analyzed result by said analyzing means with said predetermined reference pattern stored in said storage means.

2. A radar device according to claim 1, in which said analyzing means analyzes a pattern of time changes of the spectrum of said beat component.

3. A radar device according to claim 1, in which said analyzing means includes a high-speed Fourier operator.

4. A radar device according to claim 1, wherein said transmitting means, said receiving means and said beat detecting means are operated using a frequency modulated continuous wave.

5. A radar device according to claim 1 further comprising operating means for computing a relative velocity of said object, and compensating means for compensating the frequency spectrum analyzed by said analyzing means based on the relative velocity computed by said operating means.

6. A radar device according to claim 1 further comprising peak frequency detecting means for detecting a peak frequency of said frequency spectrum analyzed by said analyzing means, in which said comparing means compares the pattern of level changes of spectrum of the peak frequency detected by said peak frequency detecting means with the pattern stored in said storage means.

7. A radar device according to claim 1, wherein said radar device is portable.

8. An object detecting method comprising the steps of:

transmitting a radio wave;

receiving a reflected wave from an object irradiated by said transmitted radio wave;

detecting a beat component of said transmitted radio wave and said received reflected-wave received;

detecting a change in level in a pattern of said reflected-wave received, said change in level determining if said object contains a metal;

analyzing a frequency spectrum of said detected beat component and said change in level in said pattern;

previously storing a predetermined reference pattern; and comparing a result of analyzing the frequency spectrum and a result of analyzing said change in level with said previously stored predetermined reference pattern.

\* \* \* \* \*